United States Patent
Adams

[19]

[11] Patent Number: 6,042,357

[45] Date of Patent: Mar. 28, 2000

[54] APPARATUS FOR WEIGHTING GOLF CLUB HEADS AND SHAFTS

[76] Inventor: Robert Stewart Adams, 1401 N. Second St., Watertown, Wis. 53098

[21] Appl. No.: 09/049,812

[22] Filed: Mar. 27, 1998

Related U.S. Application Data

[60] Provisional application No. 60/042,425, Mar. 27, 1997.

[51] Int. Cl.[7] ................................................. B29C 45/76
[52] U.S. Cl. .................................................. 425/140
[58] Field of Search ............................................ 425/140

[56] References Cited

U.S. PATENT DOCUMENTS

| | | |
|---|---|---|
| 985,194 | 2/1911 | McLaren . |
| 2,163,091 | 6/1939 | Held . |
| 2,479,383 | 8/1949 | MacMillin .............................. 425/140 |
| 3,897,066 | 7/1975 | Belmont . |
| 4,145,052 | 3/1979 | Janssen et al. . |
| 4,180,269 | 12/1979 | Thompson . |
| 4,313,607 | 2/1982 | Thompson . |
| 4,319,752 | 3/1982 | Thompson . |
| 4,438,931 | 3/1984 | Motomiya . |
| 4,502,687 | 3/1985 | Kochevar . |
| 4,523,759 | 6/1985 | Igarashi . |
| 4,553,755 | 11/1985 | Yamada . |
| 4,607,846 | 8/1986 | Perkins . |
| 4,655,458 | 4/1987 | Lewandowski . |
| 4,730,830 | 3/1988 | Tilley . |
| 4,803,023 | 2/1989 | Enomoto et al. . |
| 4,824,116 | 4/1989 | Nagamoto et al. . |
| 5,007,643 | 4/1991 | Okumoto et al. . |
| 5,026,056 | 6/1991 | McNally et al. . |
| 5,050,879 | 9/1991 | Sun et al. . |
| 5,133,910 | 7/1992 | Manabe et al. .......................... 425/140 |
| 5,205,552 | 4/1993 | Green, Jr. . |
| 5,207,428 | 5/1993 | Aizawa . |
| 5,425,535 | 6/1995 | Gee . |
| 5,431,401 | 7/1995 | Smith . |
| 5,499,819 | 3/1996 | Nagamoto . |

OTHER PUBLICATIONS

Heartland Adhesives specification sheet for H300–A7 hot––melt adhesive, Heartland Adhesives & Coatings, (Date Unknown).

Material Safety Date Sheet (MSDS) for H300–A7 hot–melt adhesive, Heartland Adhesives & Coatings, (1992).

Slautterback hot–melt applicator systems materials, All––Pak, Inc. (1992).

*Primary Examiner*—Tim Heitbrink
*Attorney, Agent, or Firm*—Craig A. Fieschko, Esq.; Dewitt Ross & Stevens S.C.

[57] ABSTRACT

Melted thermoplastic is injected into a port in a hollow golf club head at high velocity so that the melted thermoplastic impinges on the club head interior opposite the port. The temperature of the thermoplastic can be such that it adheres and hardens almost immediately upon impact, thereby attaching to and weighting any area which it strikes, or it can be fluid so that the club head can be oriented after injection to have the thermoplastic flow to and weight a desired area. During this process, a weight sensor can monitor the weight of the club head and/or the weight loss in the injection apparatus so as to determine the change of weight in the golf club head. When the desired weight change is achieved, the injection apparatus can halt injection. Preferably, the injection apparatus is a hot-melt adhesive injector of the type commonly used to glue paperboard packaging materials, and the thermoplastic is standard hot-melt adhesive.

20 Claims, 1 Drawing Sheet

APPARATUS FOR WEIGHTING GOLF CLUB HEADS AND SHAFTS

CROSS-REFERENCE TO RELATED APPLICATIONS

This application claims priority under 35 USC §119(e) to U.S. Provisional Patent Application 60/042,425 filed Mar. 27, 1997, the entirety of which is incorporated by reference herein.

FIELD OF THE INVENTION

The invention relates generally to methods and apparatus for weighing golf clubs, and more specifically to methods and apparata for high-precision adjustment to the swing weight and/or the center of gravity of a golf club (or its club head or shaft) by modification of the mass distribution within golf club heads and shafts.

BACKGROUND OF THE INVENTION

Two of the characteristics of a golf club that are paid particular attention by golf aficionados are its moment of inertia, commonly known in the golfing world as the "swing weight" of the golf club, and its center of gravity) (COG). The swing weight and center of gravity are the main determinants of the "feel" and performance of the golf club.

The swing weight of a golf club is defined by the mass of the club at each location distant from the location where the golf club is gripped. A club's swing weight generally depends most heavily on the mass and configuration of the golf club head since the club head is the heaviest portion of the club and is located most distantly from the grip.

The club's center of gravity can be defined as that point within the club's volume about which the club's weight is evenly distributed; in other words, the club is "balanced" about its center of gravity. Technically, aficionados are not so much concerned with the center of gravity of the entire club, but are more concerned with the center of gravity of the club head. The location of the center of gravity within the club head is of importance because it will affect the behavior of the club on impact, and will thus affect the flight of the golf ball. If the center of gravity is situated near the toe or heel of the club head, this will affect the tendency of the club to cause the ball to hook (fly left) or slice (fly right), whereas if the center of gravity is situated too high or low on the club head, this will affect the ball's loft.

All skilled golfers want to own a set of clubs wherein each club has the desired feel, and further wherein all clubs have approximately the same feel so that swing technique does not need to be significantly varied from club to club. Sets of clubs which are precision-made to provide a uniform feel between clubs are highly valued and can command steep prices. However, it is difficult to obtain desirable swing weights and centers of gravity without taking special steps to modify these characteristics, particularly owing to the recent trend in golf club head manufacturing towards production of large heads made of lightweight material. When golf club manufacturers wish to modify the swing weight and center of gravity of golf clubs, this is primarily done by altering the mass distribution within the golf club head. This is generally done in two ways.

The first method of manufacturing golf club heads to meet a precisely-defined swing weight and center of gravity is to use precision casting processes to create club heads having the desired mass distribution from the moment the club head comes into existence. The club head is simply cast from molds having the desired form using highprecision casting processes. If the resulting golf club head does not meet the desired specifications, it is simply melted down and the casting process is repeated until a club head with the correct mass distribution is achieved. Because this method is quite time and labor intensive (and thus costly), it is generally used for expensive "luxury" golf clubs.

The second method is more suitable for mass production of golf club heads and is thus used in more common (and lower-priced) golf clubs. Large quantities of hollow golf club heads with weights below a desired target weight are produced by standard casting processes. Workers then sort the heads by mass into numerous classes (e.g., one class including club heads having a mass of 170–172 g, a second including club heads having a mass between 172–174 g, etc.). The workers are equipped with hand-held guns similar in structure and function to commonly-known fuel pump nozzles. Each gun's hose leads to a source of thermosetting urethane foam, and when its trigger is depressed, it ejects a charge of urethane foam having a predefined volume. Because the charges are of relatively uniform volume, they thus have relatively uniform weight, and therefore the heads within each class experience approximately the same weight increase. Descriptions of this or similar processes may be found in U.S. Pat. No. 4,438,931 to Motomiya, U.S. Pat. No. 4,523,759 to Igarashi, U.S. Pat. No. 4,553,755 to Yamada, and U.S. Pat. No. 4,803,023 to Enomoto et al. While this method is far easier and cheaper to practice than the precision-casting method discussed above, it suffers from several disadvantages.

First, because of factors such as variation in club head weight within each class, irregularity in charge volume owing to the stickiness and porosity of the foam, collection and hardening of the thermosetting material on the nozzle and corresponding constriction of the nozzle aperture, the worker's experience and accuracy in using the injection gun, and similar factors, this method results in a weight variation within each class of approximately ±4 grams about the desired target weight. This tolerance can cause a significant change in feel from club to club. As an example, if a set of clubs includes a #3 wood which is 4 g below target weight and a #4 wood which is 4 g above target weight, a golfer would experience a radical difference in feel when switching between the clubs.

Second, clubs in the lightest weight class (those that need the greatest weight increase) tend to get overfilled so that the hosel—the hollow stem of the golf club head—is filled with foam. Because the hosel must accommodate the golf club shaft, the hardened foam in the hosel is simply drilled out so the shaft can be inserted. These clubs then tend to be radically off-weight, and are then simply passed along to undiscerning or unsuspecting customers or are sold at a discount. On the other hand, the heads in the heaviest weight class (those that need the smallest weight increase) tend to be radically underfilled, with essentially only a small bead of foam being injected therein. Because this bead adheres to a small area in the golf club head, it tends to become unstuck after extended use and then rolls around inside of the club head. Golf clubs bearing such heads are often referred to detrimentally as "rattleheads" and are regarded as being the epitome of cheap, low-quality golf clubs.

Third, foam injection is simply not well suited for weighting of club heads wherein a very precise weight distribution is desired within the club head. In some instances, it is desirable to concentrate the weighting material at a particular area within the golf club head to achieve the desired weight distribution, e.g., to obtain the desired center of gravity. However, since foam is sticky and has fairly low density, occupying substantial volume, it is difficult for a worker to concentrate its weight at any given spot on the interior of the golf club head. Further, the guns used to inject the foam into the club heads are by no means precise, and tend to spray gobbets of foam into the interior of the golf club head at arbitrary and unpredictable locations. As a comparison, one can imagine the difficulty in trying to precisely inject a small amount of shaving cream at a particular location within a wine bottle by placing the nozzle of a shaving cream can within the bottle's mouth (and further, the bottle is opaque). While injection of foam into club heads at arbitrary locations can still provide better swing weight modification than if no weight correction is used at all, it would still be preferable to allow for the addition of weight to specific desired locations within golf club heads to allow more accurate modification of swing weight.

These difficulties have a significant economic effect on club manufacturers who are dedicated to producing quality products. When quality club sets are generated, clubs with similar swing weights and centers of gravity are matched and/or produced. Many individual clubs must be sorted through or modified before a properly matched set is generated. This takes a great deal of time, and any leftover clubs—i.e., those that cannot be properly matched into a set—are sold as individual clubs at a discount, or are donated to junior and beginning golfers. These clubs would experience increases in value of several orders of magnitude if they could simply be properly matched with other clubs.

Other weighting methods have been proposed in patents and other publications, but the inventor of the methods and apparata which this disclosure concerns has not encountered any clubs on the market which are known to be produced by these methods. Following is a description of several of these prior methods.

U.S. Pat. No. 4,502,687 to Kochevar describes inserting amounts of accurately weighed thermoplastic material within the hosel of a club head, which is then heated and positioned in a desired manner so the thermoplastic will melt and flow to the desired location within the club head. The heating and positioning may be done by use of a support fixture which incorporates a heater and which holds the club head in the desired position. The thermoplastic is then allowed to set. After thermoplastic is added, any remaining empty volume within the golf club head may be filled with foam. Preferred thermoplastics are stated to have a melting point between 230–500° F.; a viscosity similar to that of honey at normal room temperature (and a time of up to 30 minutes to flow to the desired location); and a tackiness such that the thermoplastic is very sticky even when in a solid state. Other materials, e.g., metal powder, may be mixed with the thermoplastic material to obtain desired weighting properties. This method is timeconsuming, particularly owing to the lengthy heating and flowing times and the need to preweigh both the club head and a corresponding thermoplastic weighting charge, and can thus be costly. Like foam weighting, it is also difficult to have the method generate a desired weight concentration. While it sounds practicable to orient a club head so that semiliquid thermoplastic flows into a desired area, the reality is that club head interiors may have irregular surfaces, or may be contoured such that liquids will simply not flow to the desired area because of adjacent lower areas.

U.S. Pat. No. 4,824,116 to Nagamoto et al., U.S. Pat. No. 5,007,643 to Okumoto et al., and also the aforementioned U.S. Pat. No. 4,803,023 to Enomoto et al. describe the injection of foam (or foam-generating materials) interspersed with metal or glass particles. U.S. Pat. No. 5,499,891 to Nagamoto describes performing a similar method with a synthetic resin. These methods are stated to provide superior weighing ability. However, these methods suffer from the same problems experienced with use of the aforementioned foam weighting processes. Additionally, the distribution of heavier particles within foam is uncontrollable once foam enters the club head, particularly since the particles can "sink" or drift within foam prior to hardening.

There is thus a need in the art for a method and/or apparatus which will allow for precise modification of golf club swing weights without the high expense of precision casting and without the disadvantages of known foam/ thermoplastic weighting processes.

SUMMARY OF THE INVENTION

The invention is first directed to a method for precision weighing of golf club heads (and therefore precision modification of golf club swing weights and centers of gravity) by injecting a metered charge of melted thermoplastic material into the hosel port of a club head, or another port within the club head, at a velocity sufficient to carry the majority of the charge through the entire length of the port to impinge upon the interior surface of the club head. This process is significantly different from the known foam injection processes, which use a thermosetting material and which inject at low velocity, and from the known thermoplastic insertion processes, which also insert thermoplastic charges at low velocity and which require heating of the club head to situate the weighing material. Injection at high velocity helps to insure that the weighting material will travel to the interior of the club head rather than adhering immediately within the port, and it also greatly enhances the rapidity (and thus the cost-effectiveness) of the process. Additionally, by using thermoplastic material rather than thermosetting material, weight correction is easily performed by reheating the club head and pouring out excess thermoplastic material, or by allowing the thermoplastic material to flow to a desired location within the club head.

The preferred thermoplastic material used for weighing purposes is hot-melt adhesive of the type commonly used for packaging purposes (e.g., for adhering the flaps of cardboard boxes together). Known packaging equipment utilizes adhesive application apparatus which heat the adhesive and eject it at high velocity onto products riding on a conveyor beneath. The invention ideally takes this apparatus and utilizes it as an injection means for injecting thermoplastic material into a club head. The injection means is preferably combined with a support means for receiving the club head and aligning the port along the trajectory of the ejected adhesive so that the injection apparata can inject the material into the club head. This is believed to allow for far greater precision in injection than that provided by use of a handheld injection gun since the nozzle aperture is smaller and may be precisely aligned with the axis of the port opening, allowing for more accurate application of the weighting material. Further, since injection is done at a far greater velocity, less material adheres to the hosel/port walls in the event that these walls are struck by the adhesive.

The invention also preferably utilizes a monitoring means for monitoring the amount of thermoplastic injected into the club head. This may be done, for example, by a weight sensor (such as a load cell) weighing the club head to monitor the amount of thermoplastic received, and/or by a weight sensor weighing the injection means to monitor the amount of thermoplastic injected. When the weight of the injected thermoplastic brings the club head to the desired weight, injection may be stopped. By use of such a monitoring means, the control of the charge volume (and thus weight) is far more accurately set than in hand-held guns, allowing the user to precisely vary the charge weights between approximately 0.1 grams to 30 grams or more.

One particularly unique facet of the invention concerns the treatment of the thermoplastic material prior to the time it is injected into club heads. It has been found highly useful to heat the thermoplastic material far beyond the temperature it is normally subjected to when used in packaging processes. This decreases the viscosity of the material from a gelatinous state to a state very near the fluidity of water. This allows more accurate metering of the charge, and it further has been found to significantly enhance the adhesivity of the thermoplastic to the golf club head.

Further features and advantages of the invention will be apparent from the Detailed Description of the Invention set out below in conjunction with the accompanying drawings.

DETAILED DESCRIPTION OF PREFERRED VERSIONS OF THE INVENTION

Figure 1:
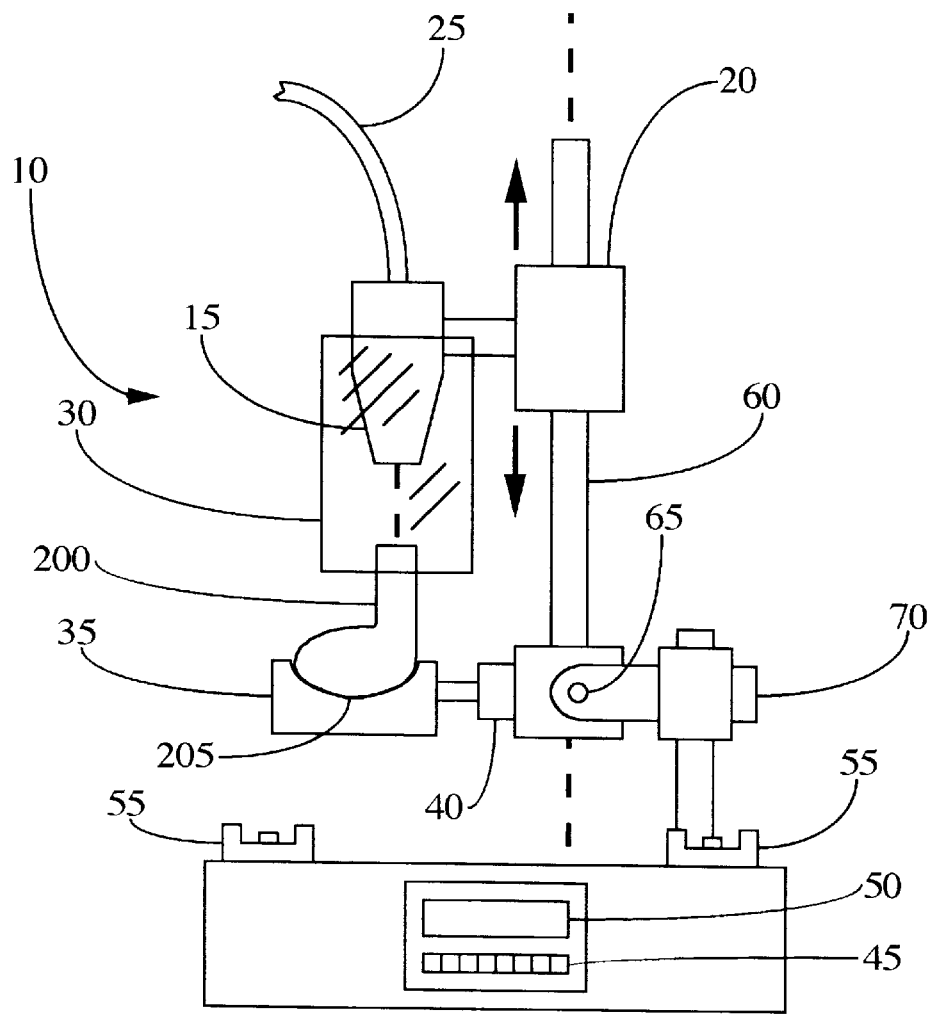
FIG. 1 is a schematic view of a preferred apparatus in accordance with the invention.

With reference to FIG. 1, the apparatus 10 includes an injection nozzle 15 mounted on a vertical slide 20 so that it may move downwardly to inject thermoplastic material into the port of a hosel 200 of a golf club head 205, or upwardly after injection has been completed. As will be discussed below, injection can also or instead be performed at a port situated elsewhere on the club head 205. The nozzle 15 is connected via a hose 25 to a reservoir 27 containing thermoplastic material. Both the hose 25 and reservoir 27 are preferably heated by heating coils or other heating apparata to maintain the thermoplastic material in liquid state to prevent collection of material and clogging. A clear transparent shield or hood 30 is provided around the nozzle 15 so that when the nozzle 15 and hood 30 are lowered adjacent the hosel 200 to start the injection process, the nozzle 15 and hood 30 are shielded. The hosel 200 is exposed when the slide 20 is raised so the club head 205 can be easily accessed.

The golf club head 205 is held beneath the nozzle 15 within a tray 35 which is contoured to receive the head 205 so that the axis of the hosel 200 port is automatically placed in and maintained along the line of approach of the nozzle 15. As will be described below, this allows the nozzle 15 to inject thermoplastic material into the port of the hosel 200, either from a distance or after entering the hosel 200. The tray 35 thus constitutes support means for aligning the hosel 200 port with the nozzle 15. Other types of support means are usable in place of the tray 35, such as other form-fitting receptacles, mechanical clamps, pneumatic grippers, or one or more magnets which retain the club head in the desired orientation. It is also sometimes helpful to remove the contoured receptacle from the tray 35 and replace it with sand, clay, or a similar generally moldable substance so that club heads 205 placed therein will be retained at whatever angle the user desires. This is particularly preferred if the apparatus 10 is to be used to custom-weigh a variety of different types of club heads.

The tray 35 or other support means is preferably supported by a load cell 40 or other monitoring means for monitoring the amount of the thermoplastic injected into the golf club head 205. The ideal load cell 40 (1) measures the tare weight of the golf club head 205 within the support means, (2) continuously measures the weight of the club head 205 as thermoplastic material is injected therein, and (3) measures the final weight of the golf club head 205 after injection has ceased. The preferred monitoring means used in the apparatus 10 is the MAGPOWR (Fenton, Mo., USA) Model CL cantilever web tension sensor. Other monitoring means such as electronic or mechanical scales may be used in place of the load cell 40, and they may measure weight at discrete times (i.e., prior to and after injection) rather than continuously monitoring the weight of the club head 205.

Controls are then provided whereby the user can actuate the nozzle 15 to inject thermoplastic material within the club head 205. The controls are preferably provided by a programmable logic controller incorporating a memory and allowing input via a keypad 45 and output via a display screen 50, though analog controls and other modes of adjusting the settings of the apparatus 10 could be used instead. In the preferred apparatus 10, the user may use the keypad 45 to enter a desired final weight for the golf club head 205, and the load cell 40 conveys the tare weight of the tray 35 or other support means (and thus the starting weight of the golf club head 205) to the controls.

The user can then start the weighting process. In the preferred version of the apparatus 10, this is done by the user inserting fingers of each hand into spaced infrared finger switches 55 which prevent the user from bringing his/her hands into the firing path of the nozzle 15 during the injection process. When the weighting process begins, the slide 20 moves the nozzle 15 downwardly until it rests immediately above, or preferably slightly within, the port of the hosel 200. Melted thermoplastic material is then injected into the port of the hosel 200. The load cell 40 monitors the weight of the club head 205 and closes the nozzle 15 when the club head 205 reaches the desired final weight. Because the nozzle 15 ejects a relatively fine jet of thermoplastic material into the club head 205 and it rests close to or slightly within the hosel 200 port, the load cell 40 fails to register only a very small amount of thermoplastic material at any time (i.e., that thermoplastic material which is free flight between the nozzle 15 and hosel 200), and thus this metering scheme results in very accurate club head weighting, within approximately 1 gram.

When the injection process is completed, the final weight of the golf club head 205 will be indicated on the display screen 50 and the user can input a new final weight if correction is needed. The user can then depress the finger switches 55 to actuate the injection of a correcting charge. Because the invention is (preferably) largely automated, it may be practiced equally well by both novice users and those who are familiar with the invention.

The preferred thermoplastic material used for weighting purposes in accordance with the invention is hot-melt adhesive of the "high tack" variety (i.e., having high adhesivity), having high density to allow greater weight concentration within a small area. A high degree of tackiness reduces (and in this case, eliminates) the possibility that "rattleheads" will be produced. Additionally, the high density of the adhesive eliminates the need to fill the club head 205 so extensively that the hosel needs to be filled as well. The adhesive also has high shelf life, which is necessary because the material will be sealed within the club head 205 for an indefinite period of time. The preferred hot-melt adhesive is H300-A7 hot-melt adhesive (Heartland Adhesives and Coatings, Germantown, Wis., USA). Adhesive of this type is commonly used in packaging processes, specifically to glue the flaps of cardboard boxes together and to glue the bindings of magazines together. Conveniently, the injection apparatus associated with the nozzle 15 for ejecting the hot-melt adhesive may be taken from packaging apparata adapted for use with such adhesive. In the preferred version of the invention, such injection apparata are provided by the Slautterback KB10 hot-melt injector/applicator equipped with a Slautterback E100 head (Slautterback Corp., Monterey, Calif., USA). This equipment, being specially adapted for high-speed packaging and assembly purposes, ejects charges of hot-melt adhesive at extremely high velocity. However, the nozzle 15 is specially made for use in the invention. The nozzle 15 is adapted to be generally conical so that its tip may be inserted slightly within the hosel port. It is also adapted to have an aperture which is preferably sized between 50%–85% the size of standard hosel 200 ports (which are generally 0.335–0.370 inches in diameter).

One particularly unique aspect of the invention is that results are enhanced if injection of thermoplastic materials occurs above their temperature ranges of standard use. For example, the H300-A7 adhesive's recommended application temperature is between 325–350° F., but it is recommended that application occur at 5%–25% above these temperatures. A temperature of 390° F. or above, which is still well below the flash point of the material, is most preferable. This is done to reduce the viscosity of the adhesive from a fluid but semigelatinous state to a viscosity approaching that of water at room temperature. This has been found to greatly enhance the adhesivity of the material on metal golf club heads, which have different surface characteristics and different thermal conductivities than the paperboard products to which the hot-melt adhesive is generally applied.

It is also recommended that the thermoplastic material be ejected from the nozzle 15 at relatively high pressure, preferably over 300 psi, so that it travels at very high velocity. This is particularly true if the thermoplastic is ejected at lower temperatures, since it ensures that the thermoplastic material impinges on the bottom of the interior of the golf club head 205 (or so that if it encounters the walls of the hosel 200 or other port, its velocity is such that it will be carried by momentum to the interior of the golf club head 205 opposite the port before it cools enough to solidify on the walls). If gelatinous thermoplastic strikes the walls of the hosel 200 or other port, the high heat conductivity of the metal walls can make the thermoplastic material cool on the walls, thereby requiring the removal of the material before the club shaft can be inserted.

The aforementioned method and apparatus additionally preferably allow for more precise addition of material within the club head to attain the desired weight distribution. This can be done by providing the stanchion 60 upon which the slide 20 rides and upon which the tray 35 (or other support means) is mounted with a pivot. This allows the nozzle 15, the support means, and the firing axis to be varied along a range of angles. The melted thermoplastic material can thereby be ejected into the port of the hosel 200 to strike the bottom interior of the club head 205, and can then flow to the location where the final weight is desired. In other words, if the stanchion 60 is considered to be aligned along a Z-axis when in the vertical position, the stanchion 60 is most preferably suspended about pivots 65 and 70 which allow rotation about the normal X- and Y-axes. This allows the nozzle 15 and hosel 200 to be situated at virtually any angle in case it is desired that the thermoplastic material should flow into different areas within the interior of the golf club head to better achieve a desired weight distribution. As an example, if it is desired that the weight distribution of the club head 205 be located near the club heel, the firing axis can simply be aligned in a generally vertical orientation so that the charge of weighting material simply hits and rests at the interior of the club head 205 near its heel. If the weight distribution is desired closer to the toe of the club head 205, the firing axis can be rotated to (for example) 45° from the vertical about the toe of the club head 205 so that the hot charge will enter the port of the hosel 200, contact the interior of the club head 205 close to the heel, and then flow in the interior of the club head 205 towards the toe until it cools to a point where it is too viscous to flow any further. This arrangement is more convenient that eliminating the pivots 65 and 70 and simply injecting thermoplastic into the club head 205 so that it rests at the bottom of the hosel 200 at the heel of the club 205, and then removing and reheating the club head 205 while holding it at an angle sufficient to have the melted thermoplastic flow to the desired location to set.

The apparatus 10 may be actuated by electrical, pneumatic, or other means. In the preferred version, a programmable logic controller electrically actuates most operations. Multiple nozzles 15, trays 35 or other support means, etc. can be provided so that a number of golf club heads can simultaneously (or sequentially) be weighted in parallel with each other.

Certain other modifications are considered to be within the scope of the invention. Following is an exemplary list of modifications that are regarded as particularly valuable.

First, various modifications can be made to the metering scheme noted above to provide for more accurate attainment of the desired final club head 205 weight. The metering scheme described above is considered to be accurate enough for general purposes, and it is certainly more accurate than the foam injection scheme known to the art. However, it may in the future be desirable to attain final club head weights which meet a target weight by 0.1 g or less. If greater accuracy is desired, the metering scheme can be revised in any one or more of the following ways: (1) the controls can turn off the nozzle 15 slightly before the desired final weight is registered by the load cell 40 so that the weight will not be "overshot" by the weight of the thermoplastic in free-flight (and a correcting charge can be added if it then turns out the head 205 is underweight); (2) the density of the material, its flow rate, and the distance between the nozzle 15 and the interior surface of the bottom of the club head 205 can be monitored by the controller so that the weight of the thermoplastic in free flight is known, and the controller can close the nozzle 15 at a time such that the thermoplastic in free flight will bring the club head 205 to the final weight; (3) the nozzle 15 can provide normal flow until a certain percentage of the desired final weight is achieved in the club head 205 (e.g., 80% of the final weight), and can then use a reduced flow rate (or can eject a series of small charges of thermoplastic) until the final desired weight is measured; or (4) load cells can then be connected to the nozzle 15 and/or reservoir 27, as exemplified by load cells 75 and 80 shown in phantom in FIG. 1, so the amount of thermoplastic dispensed by the nozzle 15 is measured rather than the amount of thermoplastic received by the club head 205. The latter two schemes are notable in that they reduce or eliminate load cell mismeasurement owing to dynamic loading generated by the falling thermoplastic falling into striking the club head 205; such dynamic mismeasurement is small enough that it generally does not create an error of ±0.5 g, but if errors are to be reduced to the ±0.05 g level, it must then be taken into account. Other metering schemes can be used as well, such as volumetric metering. In this case, the nozzle 15 may eject melted thermoplastic from monitoring means such as a volumetric chamber having a size corresponding to the weight of thermoplastic material desired. The volumetric chamber can have its size varied by the controller, as by adjusting the stroke of a piston forming one wall of the chamber, to allow variation in the sizes of ejected charges of thermoplastic. It is also notable that more accurate metering may be obtained by simply purchasing a faster (and more expensive) valve driver for the Slautterback (or other) hot melt applicator, thereby allowing thermoplastic flow to be cut off closer to the desired time. The nozzle 15 diameter can be further decreased to obtain a smaller (and more accurately monitored) flow.

Second, while the description given above generally discusses injection of thermoplastic into club heads in such a liquid state that liquidity is maintained for a short while after injection, it may be desirable in some circumstances to have the thermoplastic harden virtually instantly upon contacting the interior walls of the club head 205 so that it is incapable of any substantial flow after contact. This is relatively easily accommodated, particularly where the club heads to be weighted are made of metal and thus have high heat conductivity. Following are exemplary modifications that can be made to the above-described methods to accomplish the aim of more rapid solidification: (1) the thermoplastic material can be injected in a series of separate small charges rather than as a continuously ejected stream, wherein each charge will have sufficiently small volume that it will cool and solidify almost instantaneously upon striking the club head 205; (2) the thermoplastic material can be injected at a slower rate (which, like the aforementioned method (1), effectively provides the club head 205 with greater time to carry away heat in relation to the volume of thermoplastic being injected); (3) the distance between the nozzle 15 and the club head 205 can be increased so that the thermoplastic cools in transit; (4) the injection temperature of the thermoplastic can be decreased; and (5) the club head 205 can be cooled to promote more rapid solidification.

Third, if desired, supplementary support means situated away from the nozzle 15 (and the apparatus 10 in general) may be provided to allow the club head 205 to be removed shortly after injection, placed in this supplementary support means, and thereby held in a predetermined position to allow the melted thermoplastic material to flow into a desired location. If this is done, it is necessary to remove the club heads 205 from the tray 35 or other support means very soon after material has been initially injected because it solidifies quite rapidly against the club head 205 walls. If this arrangement is used, it may be necessary to reheat the club head 205 prior to placing it in the supplementary support means.

Fourth, it is noted that the tray 35 or other support means can be heated to maintain the thermoplastic material in a liquid state for a longer period of time after injection occurs. This may be desirable where the aforementioned supplementary support means is used.

Figure 2:
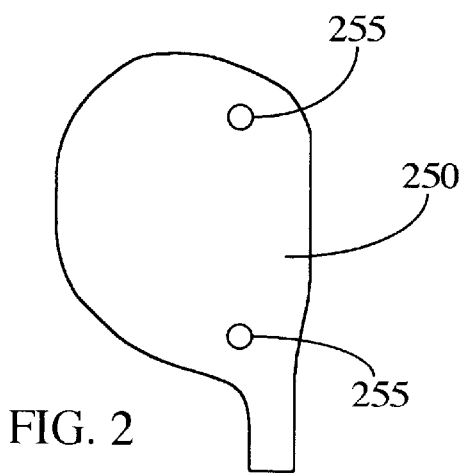
FIG. 2 is a bottom plan view of a club head bearing dual injection ports.

Fifth, as briefly noted above, extremely precise modifications of club head centers of gravity can be rapidly made by providing a club head with one or more supplementary ports (apart from the hosel port) into which thermoplastic material may be injected. FIG. 2 illustrates the bottom of a club head 250 having dual ports 255 located similarly to the ports illustrated in U.S. Pat. No. 4,553,755 to Yamada. The ports 255 therefore face the club head's heel and toe, and allow thermoplastic can be injected onto almost any portion of the walls and top of the club head 250. Small charges of thermoplastic having the desired weight can be injected onto the heel and/or toe, thereby allowing extremely precise alterations to be made to the club head's center of gravity. For example, if a golfer tends to slice (hit to the right) when using a particular club, the club head can be weighted on the back heel area to reduce slicing. As another example, if a golfer wishes to achieve greater driving distance, the top of the head can be weighted to generate overspin on the ball. Once injection has been completed at the ports, the ports may be closed by plastic plugs, metal set screws, or other closure devices. Naturally, the weight of these closure devices should be taken into account prior to injection of weight charges.

Sixth, it is also possible to modify the apparatus to allow for weighting of hollow golf club shafts. Here, the tray 35 is replaced by a clamp affixed to the load cell 40. Thermoplastic material is sprayed into the hollow shaft on the shaft walls to add weight. With trial and error, the user can even set the temperature of the nozzle and/or the charge size so that the injected thermoplastic material will flow for a particular desired distance within the shaft before it hardens. The use of the apparatus 10 for shaft weighting is believed to be highly advantageous because unlike lead weights, rubber plugs, or other solid masses which are currently used for shaft weighting, the injected thermoplastic material is flexible and shock-absorbent and does not create stress concentration points within the shaft. The shock absorbency is particularly advantageous because it helps to further improve the feel of the golf club.

Seventh, it should be understood that while the nozzle 15 is illustrated and described above as having only one degree of freedom of movement with respect to the tray 35 (i.e., the nozzle 15 and tray 35 may be distanced along stanchion 60 by use of slide 20), further degrees of freedom may be incorporated to potentially allow a greater range of injection trajectories between the nozzle 15 and club head 205. As one example, the tray 35 or other support means can be held in a static position while the nozzle 15 is movable in several degrees of freedom about the support means. Such an arrangement is shown in phantom in FIG. I by the tray 85 supported by load cell 90. Similarly, the nozzle 15 could be held fixed and the support means could be mounted on pivots and slides so that it is made repositionable with respect to the nozzle 15.

It is understood that preferred embodiments of the invention have been described above in order to illustrate how to make and use the invention. The invention is not intended to be limited to these embodiments, but rather is intended to be limited only by the claims set out below. Thus, the invention encompasses all alternate embodiments that fall literally or equivalently within the scope of these claims. It is understood that in the claims, means plus function clauses are intended to encompass the structures described above as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

What is claimed is:

1. An apparatus for weighing a hollow golf club head having one or more ports opening onto an interior surface, the apparatus comprising:

a. injection means for injecting a metered charge of melted thermoplastic into at least one of the ports at a velocity sufficient to cause the thermoplastic to impinge on the interior surface opposite the port, and b. monitoring means for monitoring the weight of the injected thermoplastic.

2. The apparatus of claim 1 wherein the injection means defines an injection trajectory along which injected thermoplastic travels, and wherein the injection means is adjustably mountable to allow the injection trajectory to be varied.

3. The apparatus of claim 1 wherein the injection means comprises a hot-melt adhesive injector.

4. The apparatus of claim 1 wherein the monitoring means comprises a weight sensor supporting the club head.

5. The apparatus of claim 1 wherein the monitoring means comprises a weight sensor supporting the injection means.

6. The apparatus of claim 1 further comprising support means for receiving the club head and orienting its port along the trajectory of the ejected adhesive.

7. The apparatus of claim 6 wherein the support means includes a tray with a depression formed therein, the depression having a shape complementary to that of a portion of the club head.

8. The apparatus of claim 6 wherein the support means includes a moldable substance wherein the club head may be inserted.

9. An apparatus for weighting a hollow golf club head having one or more ports opening onto an interior surface, the apparatus comprising:

a. a hot-melt adhesive injector, b. a support adapted to receive the golf club head, the support being situated along an injection trajectory of the hot-melt adhesive injector, and c. a weight sensor operatively linked to at least one of the hot-melt adhesive injector and the support, thereby measuring the weight of hot-melt adhesive injected into the golf club head.

10. The apparatus of claim 9 wherein the adhesive injector is adjustably mountable to allow the injection trajectory to be varied.

11. The apparatus of claim 9 wherein the weight sensor is operatively linked to the support.

12. The apparatus of claim 9 wherein the weight sensor is operatively linked to the adhesive injector.

13. The apparatus of claim 9 wherein the support includes a tray with a depression formed therein, the depression having a shape complementary to that of a portion of the club head.

14. The apparatus of claim 9 wherein the support includes a moldable substance wherein the club head may be inserted.

15. An apparatus for weighting a hollow golf club head having one or more ports opening onto an interior surface, the apparatus comprising:

a. an adhesive injector capable of injecting a metered charge of melted thermoplastic into at least one of the ports at a velocity sufficient to cause the thermoplastic to impinge on the interior surface opposite the port, b. a support wherein the club head is received with its port oriented along the trajectory of the ejected adhesive, and c. a weight sensor which monitors the weight of the injected thermoplastic.

16. The apparatus of claim 15 wherein the adhesive injector is adjustably mountable to allow the injection trajectory to be varied.

17. The apparatus of claim 15 wherein the weight sensor supports the club head.

18. The apparatus of claim 15 wherein the weight sensor supports the injector.

19. The apparatus of claim 15 wherein the support includes a tray with a depression formed therein, the depression having a shape complementary to that of a portion of the club head.

20. The apparatus of claim 15 wherein the support includes a moldable substance wherein the club head may be inserted.

* * * * *